United States Patent [19]
Goodwin

[11] 3,988,137
[45] Oct. 26, 1976

[54] METHOD AND APPARATUS FOR LUBRICATING GLASS MOLDS
[76] Inventor: George I. Goodwin, P.O. Box 348, Bloomfield Hills, Mich. 48013
[22] Filed: June 4, 1975
[21] Appl. No.: 583,534

[52] U.S. Cl. .................................. 65/26; 65/169; 65/374 M; 252/22; 252/29
[51] Int. Cl.² .................... C03B 7/00; C03B 39/00
[58] Field of Search ............... 65/24, 26, 169, 170, 65/374 M; 252/12.2, 22, 29

[56] References Cited
UNITED STATES PATENTS

| | | | |
|---|---|---|---|
| 2,246,463 | 6/1941 | Garratt | 65/170 X |
| 2,549,535 | 4/1951 | Skooglund | 65/169 X |
| 2,587,722 | 3/1952 | Garratt et al. | 65/26 X |
| 3,455,864 | 7/1969 | Dodson et al. | 252/12.2 X |
| 3,674,432 | 7/1972 | Margrave et al. | 423/489 X |
| 3,721,542 | 3/1973 | Keller | 65/26 X |

Primary Examiner—Arthur D. Kellogg
Attorney, Agent, or Firm—Robert E. Wagner; Robert E. Browne; Gerald T. Shekleton

[57] ABSTRACT
A smokeless lubricant for coating the interior surfaces of glass forming molds to protect them during contact with molten glass and to facilitate release of formed glass products, including an inert fluid carrying medium, a thermally inert chemical compound suspended in this medium and a wetting agent which causes the chemical compound to adhere to molecules of the fluid carrying medium. The method of lubricating glass forming molds with such a lubricant by mixing selected amounts of the chemical compound and wetting agent in the fluid carrying medium to form the lubricant, stirring or agitating this mixture to maintain the compound in suspension within the carrying medium, and flash-heating this lubricant to a temperature sufficient to vaporize the carrying medium and cause the chemical compound to be exploded onto the interior surfaces of the mold to coat these surfaces. An apparatus to perform the above method in timed relationship to the delivery of a charge of molten glass to the molds, having a metering means to assure that an optimum amount of chemical compound is delivered to the carrying medium, a mixer to maintain the chemical compound in suspension within the medium, delivery conduit means to transfer the lubricating mixture to the molds, injecting means to meter a desired amount of lubricant toward the molds, and a heating chamber to flash-heat the lubricant to a temperature sufficient to vaporize the carrying medium and explode the suspended chemical compound with the vapor onto the interior surfaces of the molds.

24 Claims, 5 Drawing Figures

METHOD AND APPARATUS FOR LUBRICATING GLASS MOLDS

BACKGROUND OF THE INVENTION

The present invention relates to the lubricating of glass molds in the machine manufacture of glass articles and, more particularly, to a novel lubricant and method and apparatus by which this lubricant is applied to such molds.

In operation of machines in the manufacture of glass articles, such as bottles, containers and the like, molten glass is supplied in gobs or charges from a furnace or hearth at temperatures of about 1800°–2200° F. to a gob chute for conveyance to a split cavity glass forming mold maintained at a temperature of the order of 1000° F. The mold defines a forming cavity that is disposed with its axis generally vertical, and an access opening in one end of the mold permits loading of the gob into the cavity. In one technique, the mold, upon receipt of the molten glass charge, may be inverted and compressed air blown into it to spread the glass into the shape of the cavity and thereby shape the article. The halves of the mold are then separated and the formed article is removed while still hot.

In another type of molding operation, a parison is formed in one mold, which is commonly referred to as the blank mold. This parison may include a neck cavity formed by a neck ring placed adjacent the blank mold to form the neck of the article. After forming the parison by either the above air pressure method or by use of the positive pressing force of a plunger inserted into the mold cavity in the "press and blow" process, the parison is transferred to another mold called the blow mold and formed to a final shape by a blowing technique. In both types of operation, lubricant is either sprayed onto the empty mold cavity by mechanical means or, alternatively, applied by hand swabbing, which is by far the most prevalent lubricating method today. Such lubrication of the various parts of the mold, including the neck ring, the bottom plate, the mold cavity and the plunger used in the press and blow process, is necessary to improve gob loading and to improve the release of the formed glass products from the mold and thereby prevent flaws in the product caused by sticking.

A typical molding operation involving hand swabbing may be accomplished at the operator's discretion or on a predetermined schedule which requires the machine operator to swab each mold every quarter or half hour, depending upon the type of job. In either prescheduled or discretionary swabbing, the interior parts of the mold will be manually swabbed with a cotton swab which has been dipped into a lubricant. Many different mold lubricants or "dopes" have been applied to various parts of the mold assmebly that contact the glass by either the hand method or by periodically bringing a mechanical spray unit to the proximity of these parts on the machine.

There are several significant disadvantages in present methods of lubricating molds, either by hand or automatically. Hand swabbing, aside from being hazardous, requires application of lubricant at a time when the cycle of the machine mechansim permits. This is usually well in advance of the time the lubricant is most needed and is often a hit-and-miss application. Hand application usually results in intentional over-application of the dope to assure coverage and cut down on the frequency of swabbing, but this results in "dirty" products due to the excess lubricant and also creates a severe smoke hazard in the work area. While the articles rejected because of excess lubricant can be recycled or remelted, considerable expense is involved in the time and wasted energy required to accomplish this.

Mechanized spray units, on the other hand, complicate the cycle of the machine and require that the mold parts to be lubricated be made accessible for insertion of a spray nozzle and time allowed for spraying and removal of the nozzle before beginning the forming cycle again. The extra moving parts create a hazard of interference between the nozzle and the mold parts and also a problem of extra maintenance for the increased number of mechanical parts. Fixed lubricant sprays have been used where spray equipment is stationary, but in these devices uniformity of lubricant application in the areas where it is most needed has not been obtained with regularity.

In either the hand or mechanized method of lubrication, one or more cyles of molding may be missed because of the time required for the swabbing or spraying operation. This ultimately adds to the loss of productivity and may result in non-uniform, excessive or incomplete lubrication of the mold parts.

Further problems are created by the lubricants themselves. Present lubricants normally consist of oils or compounds containing or carrying oils. Such lubricants are unable to withstand the high temperatures and mechanical abrasions of the gob and finished product in the molding operation in a satisfactory manner. These lubricants, when subjected to such temperatures, tend to burn on the surfaces of the mold, or other parts of the molding machine where they may be accidentally dripped, presenting not only a potential fire hazard out invariably creating clouds of smoke, which have been recognized by various states as an actual pollution and health hazard. Finally, in spraying such oils, complete coverage of essential mold parts, such as the neck ring or the bottom plate, is often impossible to obtain unless special and complicated nozzles are used to spray laterally or in an upward direction directly at these parts.

SUMMARY OF THE INVENTION

The present invention provides a solution to the above problems and is particularly useful in providing permanent lubrication for all necessary parts of the mold, including the neck ring, bottom plate, mold cavity and plunger, if used. It eliminates all of the disadvantages set forth above, resulting in longer mold life, no pollution, improved productivity and elimination of a potential fire hazard. This invention overcomes the problems of the prior art by an improved, thermally resistant lubricant which may be effectively and completely coated over the glass forming surface areas of the molds by a novel method and using an unobtrusive and uncomplicated apparatus.

The lubricant of the present invention achieves the above long-desired advantages by use of a normally dry, thermally inert chemical compound such as tetrafluoroethylene or graphite fluoride $[(CF_x)_n]$. The latter preferred compound is stable carbon monofluoride having a maximum super stoichiometric fluorine-to-carbon ratio prepared by the method described in U.S. Pat. No. 3,674,432 to J. L. Margrave et al. In the preferred form, the fluorine-to-carbon ratio is greater than 0.99/1.00 or less than 1.12/1.00, which provides for a more stable composition capable of withstanding high heat while retaining lubricitive properties.

The graphite fluoride is normally a very finely powdered material which is selectively metered into a known volume of a fluid carrying medium, such as water, and agitated or mixed within the medium so that the graphite fluoride particles are maintained in a uniform suspension within the carrying medium. The carrying medium and the suspended lubricating compound are then conducted under pressure or by other suitable means to the mold area where the mixture is injected in a metered volume at selected times into a heating chamber which flash-heats the mixture to a temperature sufficient to vaporize the fluid carrying medium, converting it immediately to a super heated vapor, in this case steam, which expands so dramatically with the absorption of thermal energy which caused it to change phase, that it literally explodes from the heating chamber onto all parts of the adjacent mold toward which it is directed. The steam carrier thus acts to completely cover these parts with a uniform dispersion of the lubricating compound. The high temperature of the mold will cause the carrying medium, which is non-combustible, to be heated to a point where it will completely evaporate from the surface of the mold or be broken into its hydrogen and oxygen elements, leaving only the dispersed particles of graphite fluoride on the interior surface of the mold.

A wetting agent may be added to the mixture of the fluid carrying medium and the lubricating compound to improve the adhehrance of the lubricating compound to the molecules of the carrying fluid in both liquid and vapor form and thereby provide a better, more uniform dispersion of the lubricating compound throughout the carrying medium and assure conveyance of the lubricating compound by the vaporized medium to all the interior mold surfaces.

A unique apparatus has been designed for performing the lubricating method of this invention and includes a metering means for metering the selected amount of graphite fluoride into the water carrier, a pump for pumping the mixture through the delivery conduit toward the molds, a further metering means for injecting a selected amount of the lubricant mixture, and a heating chamber for flash-heating this amount of the mixture sufficiently to vaporize the carrying medium and provide an explosive dispersion of lubricating particles into the glass molds. It can be readily appreciated that such a dispersion, under these conditions, will coat areas of the mold which have been difficult to lubricate because of their inaccessibility. The apparatus above described is preferably automatically synchronized with the delivery of a charge of glass so that the machine operation is never disrupted or delayed. Such means of synchronization may include electronic sensing means positioned adjacent the gob delivery means which sense the passing of each gob and relay this information to the metering and injection valves which act according to the method above desribed to lubricant the molds.

Accordingly, it is an object of this invention to provide a new and improved lubricant for glass forming molds and a method and apparatus for automatically coating these molds with such a lubricant during a glass manufacturing operation.

It is a further object of this invention to provide a method of lubricating glass forming molds with a permanent lubricant which will not cause pollution and will not deteriorate under the high temperatures experienced during molding.

It is a still a further object of this invention to provide a new and improved lubricant for glass manufacturing which is required to be applied only sparingly, thereby reducing the total volume of lubricant needed in the molding operation.

It is another object of this invention to provide a method of lubricating glass forming molds used in a glass manufacturing operation which assures that the mold surfaces contacting the glass charges will be completely coated with a lubricating compound in a desired amount without any delay in the glass making operation.

It is one more object of the present invention to provide an apparatus for automatically lubricating glass forming molds used in a glass manufacturing operation in timed relationship to the charging of such molds with molten glass.

These and additional objects of the present invention will become apparent by consideration of the accompanying drawings and succeeding description.

Figures 1, 2:
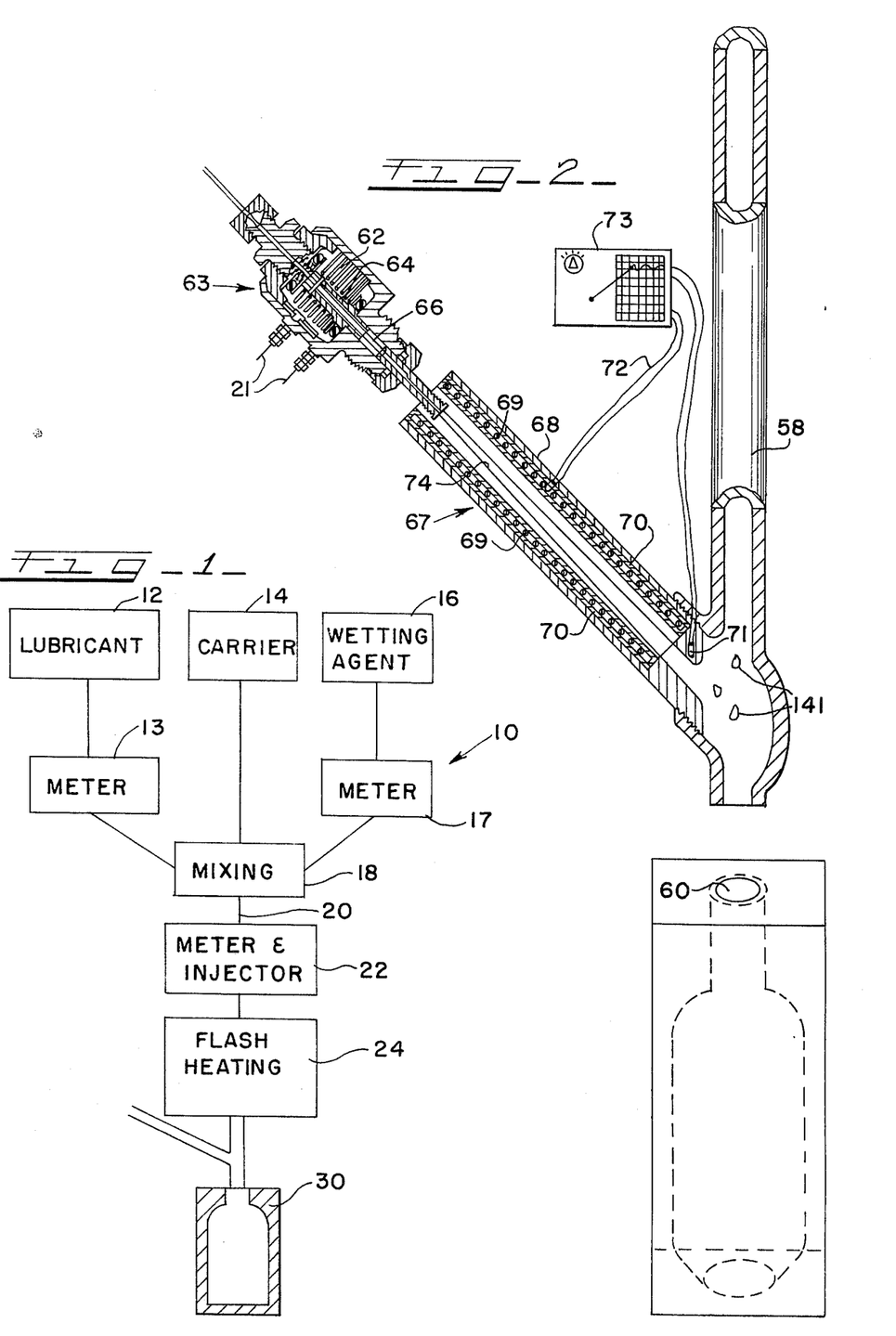
FIG. 1 is a general flow diagram of the lubricant mixing and delivery process of the present invention.
FIG. 2 is a portion of one version of the lubricant delivery apparatus capable of use in the process of FIG. 1.

Referring now to the drawings, and in particular to FIG. 1, a flow diagram of a lubricant mixing and delivery process according to this invention is shown at 10. A lubricant compound reservoir 12, a supply of thermally inert or noncombustible fluid carrying medium, such as water 14, and, if desired, a supply or reservoir of a wetting agent 16 to reduce the surface tension of the lubricant towards the fluid carrying medium is included. In this particular embodiment a meter 13 is also positioned in the conduit between the lubricant reservoir 12 and a mixing container 18 to operate to furnish a predetermined volume of lubricant for mixing with the fluid carrying medium 14. A similar meter (not shown) may be also placed in the conduit between the fluid carrying medium and the mixing container to meter the fluid carrying medium. A meter 17 may be used to determine the amount of wetting agent 16 passed to the mixing container 18.

The lubricant compound, the fluid carrying medium and the wetting agent are then combined by mixing in the mixing container 18 and continually agitated to keep the lubricant compound in suspension and in the carrying medium. The lubricating mixture thus formed is transferred by a delivery conduit 20 through a meter and injection valve 22. This valve may be mechaniclly or electrically operated and acts to meter a selected amount of the lubricating mixture toward the molds shown at 30. Since the lubricating mixture is preferably moved through the delivery conduit 20 under pressure, it is forcefully injected toward molds 30.

In the preferred embodiments of this invention, the lubricating mixture is transferred from the valve 22 directly into a flash-heating or combustion chamber 24 having a temperature of approximately 600° F. The lubricating mixture is immediately flash-heated through a phase change into a vapor state, such as super-heated steam in the case of a water carrying medium, such that it drastically expands in volume and explodes into the mold cavity, thereby coating the inside of the mold cavity with the lubricating compound which has been suspended in the carrying medium. Since the mold is normally maintained at a temperature of approximately 1000° F., the carrying medium will be broken into its compound elements, such as hydrogen and oxygen, and removed. At lower temperatures, the steam will remain as a cushion to assist in preventing contact between the surfaces of the mold interior and the glass charge.

As can be appreciated, the mixing delivery of the lubricating compound according to the above system can be accomplished by many different forms of apparatus, connected in different arrangements and controlled by various electronic or mechanical means. Two novel systems for accomplishing mixing and delivery in timed relation to the glass making operation will be described below, however, the method of lubricating glass molds disclosed herein is not to be limited to use in such systems but to be accomplished by any equivalent means which can achieve the same result through the use of substantially the same steps.

Figures 3, 4:
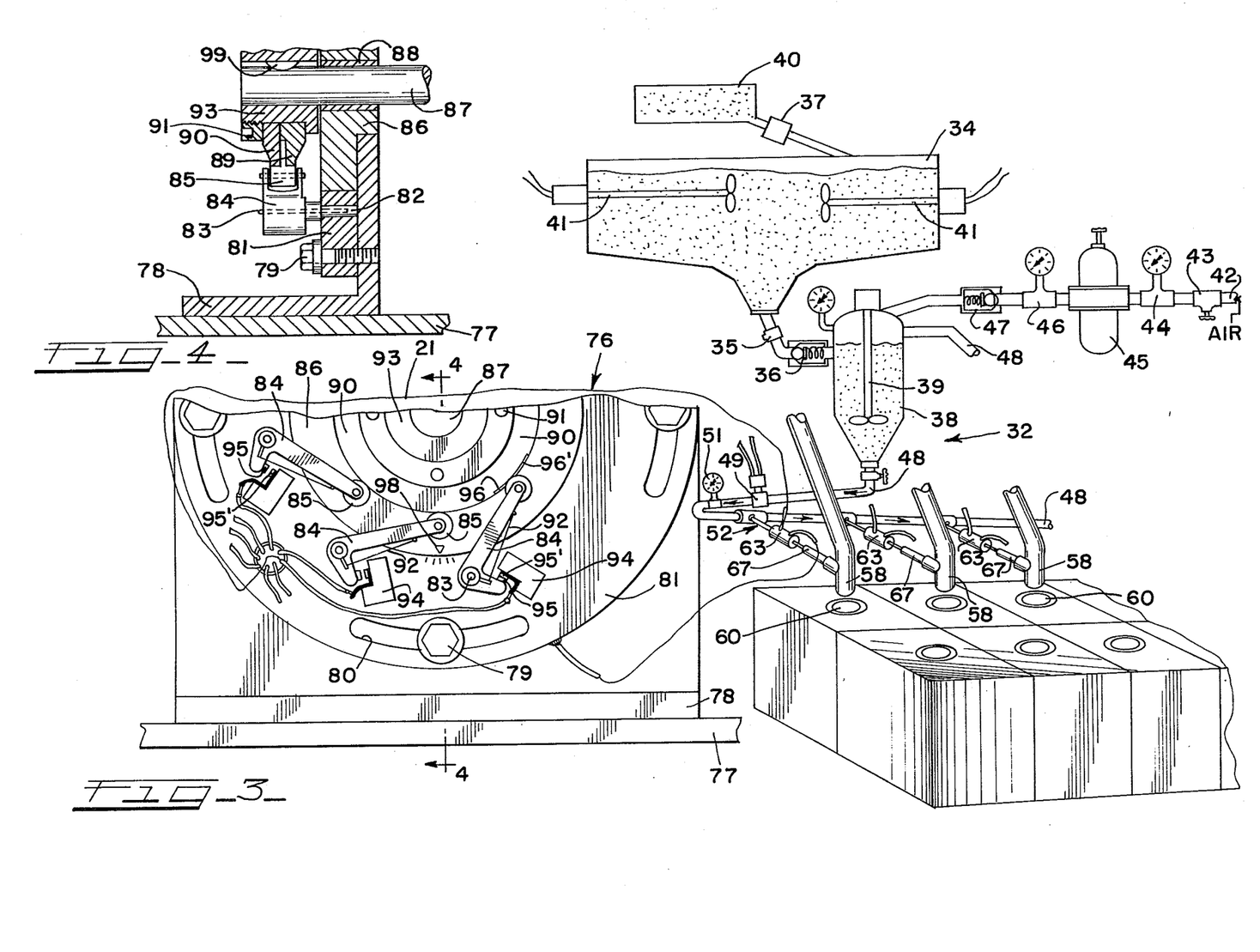
FIG. 3 is a timed lubricant mixing and delivery system shown partially in schematic and illustrating the timing mechanism in slightly enlarged elevational detail.
FIG. 4 is an elevational cross-sectional view of the timing mechanism shown in FIG. 3 taken generally along line 4—4 therein.

FIG. 3 shows a system and apparatus for the lubrication of glass forming molds having an electro-mechanical means to control the delivery of selected volumes of lubricating mixture at timed intervals determined by the movement of the glass forming machinery and thereby form a system for mold lubrication. This system 32 has a lubricant mixture holding tank 34 which contains the mixture of a lubricating compound, such as carbon monofluoride, mixed proportionally, as determined by trial and error, with a quantity of fluid carrying medium, preferably water, sufficient to achieve a uniform dispersion of the lubricant. A chemical holding tank 40 in communication with tank 34 provides wetting agents, as controlled by valve 37, to be mixed with the carbon monofluoride and water. A pair of agitators 41 are mounted on opposite sides of the holding tank 34. These have propellers mounted on a shaft driven by a variable speed motor to mix and agitate the lubricating mixture in holding tank 34 and thereby maintain the $CF_x$ in suspension and uniform dispersion in the water.

In system 32, a quantity of the lubricating mixture is allowed to flow through a conduit having a shutoff valve 35 and a check valve 36 associated with it into a pressurized holding tank 38, as required by a drop in the level of the lubricating mixture in the pressurized holding tank and the pressure in the tank. This closed holding tank 38 is kept under artificial pressure by communication to the service air line 42, normally found in most industrial operations. This compressed air line connection includes a shutoff valve 43, pressure gauge 44, pressure control tank 45, output air pressure gauge 46 and check valve 47. Another agitator 39 is mounted with its blade near the lower portion of tank 38 to maintain the carbon monofluoride in suspension in the water carrying medium. The lower, outlet end of tank 38 opens into a common delivery conduit 48 which transfers the lubricating mixture to the molds and allows it to circulate back into the upper end of the pressurized holding tank 38 such that a continuous circulation system is established. Any excess lubricating mixture which is not injected in the molds is therby recirculated into the tank for reuse. This common delivery system 48 is used to supply the lubricating mixture to all mold cavities required by the molding operation or type of glass manufacturing machine used. A pump 49, which may be of any conventional design including a peristaltic pump, is associated with the delivery conduit 48 and is used to force the lubricating mixture through the conduit in the direction of the arrows shown in FIG. 3. A pressure gauge 51 determines the pressure within the delivery conduit 48.

At each mold cavity 60, conduit 48 is tapped by a T-connection 52 which allows the pressurized lubricating mixture to move out of the main delivery conduit and leads it toward an injecting and metering valve 63 and a heating chamber 67. These elements force the lubricating mixture, in the form of steam, into the lower end of a tube 58 which conveys the molten glass charges or gobs into mold cavities 60. In the preferred form of this invention, whatever type of mixing and delivery system is used, conveyor tube 58 has, associated with it, a suitable metering and injection valve and a heating chamber. The general function of the metering and injection valve is to inject a predetermined amount of the lubricating mixture into the heating chamber at a certain desired time during the glass manufacturing process to assure that the interior walls of the glass molds are coated with the thermally resistant $CF_x$. The timing of this valve may be controlled mechanically, electro-mechanically by means such as that shown in FIG. 3 which is operated by the relative movement between the molds and conveyor tubes, or thermo-electrically as shown in FIG. 4 by movement of the glass charges or gobs down the conveyor chute. Two different types and configurations of injection and metering valves and heating means are shown in FIGS. 2 and 4. While these are described in relation to the systems shown in FIGS. 3 and 4, respectively, they may be interchanged with one another or replaced by similar-functioning valves to achieve the desired results.

The valve shown at 63 in FIG. 4 is normally termed a vibrating valve and is shown in more detail in FIG. 2. This valve includes a laminated body 62 surrounding a laminated magnetic armature 64 and operates similar to an electric motor having, however, a rectilinear instead of a rotary motion. The lightweight armature 64 moves only approximately one-sixtyfourth of an inch to permit extremely high speeds of operation. The valve body 62 forming the field is usually made of layers of soft iron and non-magnetic material held together between end plates. A valve needle and plunger 66 carrying armature 64 is inserted through the hollow core of the body 62. When the valve is closed, the laminations of the armature are displaced relative to those of the valve body by the thickness of one lamination. When current is passed to the valve through wires 21 leading from the timing device, the magnetic laminations carrying the magnetic field align themselves during the period of time when the valve is electrically activated. When the needle 66 is opened, it allows a charge of pressurized lubricating mixture to be injected into the tapered walls of the combustion chamber 67.

Figure 5:
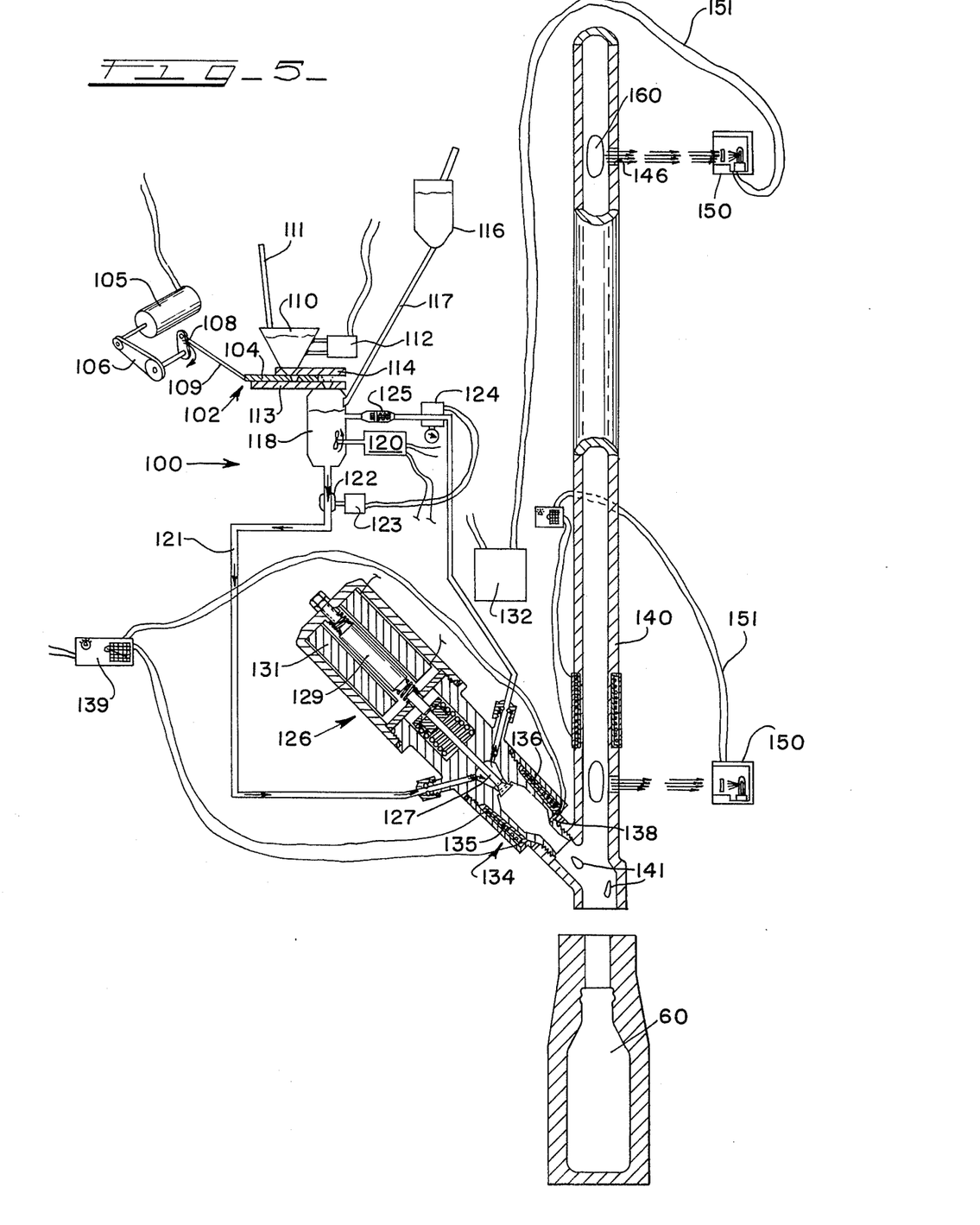
FIG. 5 is a second embodiment of a timed lubricant mixing and delivery system shown partially in schematic and illustrating the delivery apparatus in a slightly enlarged cross-sectional elevational view.

Combustion chamber 67 includes an insulating cover 68 to prevent heat loss, and a heating coil 69 disposed in a ceramic housing 70. Ceramic has a high strength at high temperatures, yet good thermal conductivity. As the lubricating mixture spray is injected under pressure into the passageway 74 formed in chamber 67, it is immediately heated to an extremely high temperature, changing the phase of the water carrying medium to superheated steam. Since this steam immediately seeks to expand in volume, it forces itself, together with the $CF_X$ which remains suspended therein, toward the outlet end of the combustion chamber, which leads into the conveyor tube 58 and on into the mold cavity 60. The conveyor tube and/or the delivery conduit leading from the heating chamber may have baffles, vanes or depressions 141 as shown in FIG. 2, formed therein to cause turbulance in the steam-carried lubricating mixture, to maintain the $CF_X$ in suspension until it reaches the interior of the mold 60.

The temperature of the combustion chamber determines the temperature of the lubricating mixture after the fluid has been converted to a vapor. This temperature is sensed by a thermocouple 71 located near the outlet end of the combustion chamber. The temperature may be read out visually or recorded on control box 73. This control is then used to regulate the temperature of the coil 70 through wires 72 to obtain the temperature of steam desired.

Since optimum lubrication requires that the mold cavities be completely coated with lubricant compound at a time when they are empty and also when there will be no interference to the regular operation of the glass forming machine, the injection and metering valve 63 is connected to a timing mechanism 76, which is shown in FIGS. 3 and 4. The timing mechanism 76 includes a bed 77 located on the mold table, a bracket 78 and a rocker arm ring 81 which is adjustable relative to bracket 78 by angular movement relative to an adjusting bolt 79 which is inserted into an adjusting slot 80 formed in ring 81. This angular movement of the rocker arm ring 81 relative to bracket 78 will allow regulation of the time of injection of the lubricating mixture, as will be described below. A timing shaft 87 extends through an opening formed in bracket 78 and is connected to the driving mechanism of the glass molding machinery, i.e., the movement of the gob delivery tubes relative to the molds. Shaft 87 is mounted relative to the opening in the bracket tube by means of a shaft bushing 88 and a spacing ring 86 which also locates the rocker arm ring 81 in relation to bracket 78 and the shaft 87.

At the outward end of the shaft, a key slot is formed axially therealong in an outside surface thereof. An inwardly extending key 93 is disposed in this slot to mount a timing ring bushing 93 in a fixed position relatvie to the timing shaft 87. This provides a mounting base for the mounting of an inner timing ring 89 and an outer timing ring 90 thereon. These timing rings have similarly shaped timing slots or valleys 96 and 96′ formed in a portion of their outer peripheries for determining the period of injection of the lubricating mixture. On the rocker arm ring 81 is mounted a series of spaced rocker arm plugs 82. These plugs, which have a hollow outwardly extending portion, receive rocker arm pins 83 which support a corresponding number of rocker arms 84. The rocker arms 84 are pivotal about the rocker arm pins 83. One end of the rocker arm 84 is biased inwardly toward the timing rings 89 and 90 by spring 92 such that a rocker arm roller 85 is maintained in contact with the surface of the two timing rings. The rocker arm roller is wide enough so that it substantially spans the thickness of both timing rings. At the opposite end of the L-shaped roller 84 is a contact point 95. This point is normally held in a spaced relationship to a similar contact point 95′, which is located on a stationary contact insulating block which is mounted on the base of the rocker arm ring 81.

The rocker arm roller 85 rides along the outer surface of the two timing rings 89 and 90 until it comes to the timing slots or valleys 96 and 96′. The roller then falls into this slot, thereby pivoting to close contacts 95 and 95′. This allows current to flow through wires 21 to energize and operate valve 63. The length of time roller 85 rides in the timing slot will determine the duration of the valve opening. This time may be varied by adjusting timing slots 96 and 96′ relative to one another. When rings 90 and 89 are positioned with their slots end to end, the duration of the valve opening will be the longest. Movement of the rings in opposite directions will shorten the length of time the roller rides a depressed timing slot. The rings 90 and 89 are adjusted by adjusting a clamping nut or spanner clamp 91. The moment of valve opening with respect to the operation of the system can be varied by adjusting the relative positions of the timing indicator marks 98 to move the rocker arm ring 81 relative to the shaft 87 and the timing rings 89 and 90. This will change the point in time at which the roller contacts 85 drop into the timing slots to cause the vibrating valve to open.

Referring now to FIG. 5, a second system for lubricating glass molds and an apparatus comprising this system are shown generally at 100. The delivery portion of this system includes $CF_X$ metering apparatus 102 including a tank 110 containing a supply of lubricating compound fed through a supply line 111 and agitated by vibrator 112. A quantity of this lubricating compound is metered into a closed mixing tank 118 to form the lubricating mixture. While the means for measuring this quantity of fluid may be any suitable means, that shown consists of a lower metering plate 113 having an opening therein above the top of the mixing tank 118, an upper metering plate 114 having an opening therein at the bottom of the storage tank 110, and a measuring slide 104 sandwiched between these two plates and having an opening formed therein which travels between the opening in upper plate 114 and the opening in lower plate 133. A variable speed slide motor 105 is connected by a belt 106 to a bell crank 108 and a drive 109 to reciprocate slide 104 and move an amount of $CF_X$, in the opening in slide 104, to deposit it in mixing tank 118, where it is mixed with a fluid carrying medium, such as water, which enters tank 118 through a storage supply 116 and a condu 117. The mixture of the water and $CF_X$ is continuously agitated by an agitator 120.

In this system, the lubricating mixture is continuously circulated through a common delivery conduit 121 which transfers the mixture to the injection and metering valves, removes any excess and returns it to the mixing tank 118.

The lubricating mixture is forced through conduit 121 by means of a pump 122 powered by a variable speed motor 123 which is in turn connected to a pressure control 124 to control the pumping rate. On the return side of the conduit 121 is also located a back pressure valve 125 ahead of the mixing tank 118. An injection metering valve 126 is located in communication with the lower end of the gob or conveyor chute 140 so that a steam-carried lubricating compound is fed into the gob chute to coat the mold cavity 60. The valve 126 is a normally closed, spring loaded, vibrating solenoid or other functionally equivalent valve such as that previously discussed. Valve 126 normally includes a coil 131 and an armature 129 which moves within the coil when the coil is energized by electrical current to produce a magnetic field. The travel of the valve plunger 127 to open the valves is determined by the armature springs 130 and valve spring 128.

When the valve is opened, a stream of lubricating mixture is positively injected into a cylindrical combustion chamber or steam generator 134. Chamber 134 has threaded connections at its opposite end to permit it to be mounted between the injection valve 126 and the gob chute 140. The chamber has a ceramic sleeve 135 and interior heating coils 136 to heat the temperature of the stream of lubricating mixture to apporximately 600° F. in a very short time. The fluid carrying medium is converted to super-heated steam and acts to explode the lubricating compound through the outlet into the gob chute 140. As before, a series of indentations or baffles 141 on the interior walls of the gob chute and connecting tubes act to cause spiral motion of the steam-carried $CF_x$ to assure uniform coating of the interior of the mold cavity with the $CF_x$ particles. The temperature in the combustion chamber is again controlled by recording and control means 137 which senses the exit temperature of the lubricating mixture through thermocouple 138.

System 100 injects the lubricating mixture in response to the movement of glass charges or gobs 160 downwardly through the chute 140. This movement is detected by a completely electronic sensing system which acts to activate valve 126 and thereby inject the lubricant mixture into the steam generating chamber 134. The sensing system includes a number of sensing means which may consist of pyrometers 150 located adjacent windows or openings 146 in the walls of the gob chute 140. These pyrometers 150 may be any suitable commercial models which respond to infrared rays emitted by the extremely hot molten glass and transmit corresponding electrical pulses through wires 151 to control 132, thereby signalling that a glass gob is passing a particular window 146. Control 132, which is in communication with the power supply (not shown), immediately activates the solenoid by causing electric current to flow into the coil, thereby opening the valve and allowing lubricating mixture to be injected into the combustion chamber.

While the precise timing of this system must be determined with a minimum of experimentation, it is thought that the system will function to the best advantage if spraying is done just prior to charging of the mold.

This invention is not limited either to the use of water or $CF_x$ in forming the lubricating mixture; however, water is of some advantage as a fluid carrying medium since it will carry the $CF_x$ into the desired position in the mold as steam but automatically remove itself upon further heating and no longer occupy space. In addition, water, or water as steam, is normally chemically inert so that there will be no smoking or pollution caused by this invention. This invention further contemplates the use of any chemical which may be found to cooperate with the $CF_x$, either as a lubricant or as a wetting aid, to cause the $CF_x$ or other lubricating compound to become more permanent within the mold or more susceptible to being dispersed and carried by the fluid carrying medium molecules.

While the invention has been described in relation to preferred embodiments thereof, it will be clear to one of ordinary skill in the art that certain modifications in the apparatus, system and lubricating mixture can be made and that the invention should only be limited by the scope of the appended claims.

I claim:

1. An apparatus for lubricating glass forming molds which receive charges of molten glass in a glass manufacturing operation and form these charges into desired shapes, including means for delivering a selected quantity of normally dry, thermally inert lubricating compound into container means supplied with a fluid carrying medium, mixing means operatively disposed in associatin with said container means for mixing said metered amount of said lubricating compound in said fluid carrying medium such that said lubricating compound is dispersed and suspended in said fluid carrying medium to form a lubricating mixture, delivery conduit means to transmit said lubricating mixture to said molds, and injection means associated with said delivery conduit means including means to supply a measured amount of said lubricating mixture to the interior surface areas of said molds and means to sense the movement of said glass charges in a delivery chute prior to delivery of said glass charges into said molds, said means to sense actuating said means to supply in response to the movement of said glass charges in a delivery chute causing a measured amount of said lubricating mixture to be supplied to the interior surface areas of said molds prior to delivery of said glass charges into said molds.

2. The apparatus of claim 1 including second reservoir means containing a wetting agent, said second reservoir being in communication with said container means through conduit means, whereby said wetting agent may be added to the mixture of said fluid carrying medium and said lubricating compound in said container means to cause said lubricating compound to dissipate in said fluid carrying medium more completely.

3. The apparatus of claim 1 including pump means associated with said delivery conduit means, said pump means causing said mixture to be transmitted from said container means to said injection metering means under pressure to facilitate application to said molds.

4. The apparatus of claim 1 including a closed circuit conduit means communicating with said container means, said injection metering means and the fluid carrying medium supply in a continuous closed circuit to allow said mixture to be continuously circulated through said closed conduit.

5. The apparatus of claim 1 including control means for controlling the operation of said injection metering means such that a selected volume of said mixture containing said suspended lubricating compound is delivered to each of said molds prior to the arrival of said glass charge in said mold.

6. The apparatus of claim 5 wherein said control means includes thermal sensing means which electrically operate said injection metering means in response to the movement of glass charges toward said molds.

7. The apparatus of claim 1 including heating means associated with said injection metering means which heats said mixture to such a temperature that said fluid carrying medium is vaporized, thereby carrying said lubricating compound in suspension into the interior of said molds.

8. A method of lubricating glass forming molds which receive charges of molten glass in a glass manufacturing process and form these changes into desired shapes, particularly adapted to protect the surface areas of the molds which come into contact with the molten glass and facilitate release of the formed glass products from these mold surfaces thereby preventing marking and stressing of the formed glass, characterized by the steps of mixing a fluid carrying medium with a selected amount of normally dry, thermally inert lubricating compound to form a lubricating mixture, in which said lubricating compound is dispersed and suspended in said fluid carrying medium, and rapidly pre-heating a selected amount of said mixture sufficiently prior to its introduction into said molds to vaporize said fluid carrying medium of said selected amount of said mixture, such that said fluid carrying medium will suddenly greatly expand in volume causing said thermally inert lubricating compound suspended in said carrying medium to be carried with said expanding carrying medium toward and into the interior of each of said molds to coat and line the interior surface areas thereof.

9. The method of claim 8 wherein said fluid carrying medium is water.

10. The method of claim 8 wherein said thermally inert lubricating compound is carbon monofluoride.

11. The method of claim 8 wherein said thermally inert lubricating compound is tetrafluoroethylene.

12. The method set forth in claim 8 including the steps of transferring said mixture under pressure through conduit means to a position adjacent said molds while maintaining said thermally inert lubricating compound in suspension in said fluid carrying medium, and spraying a volume of said mixture into a combustion chamber where said mixture is flash-heated sufficiently to convert said fluid carrying medium to a super-heated vapor to carry said lubricating compound onto said mold surface areas.

13. The method set forth in claim 12 wherein said mixture including said fluid carrying medium carrying said thermally inert lubricating compound is injected into said combustion chamber for vaporization and introduction into the interior surface areas of said molds in timed relationship and in response to the movement of a charge of molten glass through a conveyor tube prior to entry into the mold.

14. The method set forth in claim 13 wherein said mixture is introduced into said molds in response to the movement of said charge of molten glass down said conveyor tube and prior to the movement of said charge of said molten glass into said mold by control means which controls both the amount of said lubricating mixture injected into said combusion chamber and the moment at which said mixture is injected into said combustion chamber.

15. The method of claim 8 including adding a chemical catalyst to said mixture to act as a wetting agent to improve the dispersion of said thermally inert lubricating compound in said fluid carrying medium.

16. A system for lubricating glass forming molds which receive charges of molten glass during a glass manufacturing process and form these charges into desired shapes, including lubrication delivery means to deliver a lubricating mixture composed of a thermally inert lubricating compound suspended in a fluid carrying medium to said molds, injection metering means associated with said lubrication delivery means to introduce said lubricating mixture into said molds, heating means disposed adjacent said metering means to rapidly heat said lubricating mixture as it is delivered into said molds sufficiently to vaporize said fluid carrying medium of said mixture and control means in communication with said injection metering means and operating automatically to activate said injection metering means to assure delivery of said lubricating mixture to said molds at selected times prior to the arrival of a glass charge in each of said molds.

17. The system set forth in claim 16 wherein said control means includes electro-mechanical timing means operating in response to the relative movement of conveying means for carrying said charges of molten glass to said molds to activate said injection metering means in timed relationship to such relative movement to assure lubrication of said molds at predetermined times prior to the arrival of said glass charges therein.

18. The system set forth in claim 16 wherein said control means includes sensing means disposed adjacent conveying means for carrying said glass charges to said molds from a molten glass hearth, said sensing means automatically operating to activate said injection metering means in a timed relationship to the movement of said glass charges relative to said conveying means, as sensed by said sensing means.

19. The system set forth in claim 18 wherein said sensing means includes thermo-electronic sensing means disposed adjacent said conveying means and responsive to the temperature of said glass charges moving along said conveying means as indicated by infrared rays emanating from said glass charges, said sensing means, upon receiving said infrared rays from one of said glass charges, communicating an electrical signal to activate said metering means to allow passage of said lubricating mixture into said heating means to vaporize said fluid carrying medium and thereby disperse said lubricating compound into said molds.

20. A lubricant mixture particularly adapted for use in glass manufacturing operation to coat the interior surface areas of glass forming molds which come in contact with charges of molten glass to protect these surface areas and to facilitate the release of the formed glass product from these mold surfaces thereby preventing marking or stressing of the formed glass, including fluid carrying medium comprising a super-heated steam and a thermally inert lubricating compound comprising carbon monofluoride which, upon continuous mixing and agitation with said fluid carrying medium will remain in suspension in said fluid carrying medium and will be carried by said fluid carrying medium in suspension such that expansion of said fluid carrying medium occurs and said thermally inert lubricating compound will be dispersed on the interior surfaces of said molds upon entry into said molds to uniformly coat said surfaces, said fluid carrying medium being evaporated or broken into chemical elements upon contact with said mold surfaces and/or molten glass charges rather than leaving a residue within the mold.

21. The lubricant mixture set forth in claim 20 including a chemical compound which is added to said mixture of said fluid carrying medium and said lubricating compound to act as a wetting agent to improve the dispersion of particles of said lubricating compound in said fluid carrying medium.

22. The lubricant mixture set forth in claim 20 wherein said fluid carrying medium is water which may be vaporized into super-heated steam by transfer of sufficient heat thereto and thereby exploded, with said suspended lubricating compound into said mold and further evaporated by heat from said mold or said molten glass out of said mold.

23. The lubricant mixture set forth in claim 20 wherein said lubricating compound is a normally dry, thermally inert chemical such as carbon monofluoride.

24. The lubricant mixture set forth in claim 20 wherein said lubricating compound is a normally dry, thermally inert chemical such as tetrafluoroethylene.

* * * * *